April 19, 1966    W. L. TODD    3,246,919
WELL COUPLING
Filed April 9, 1963    4 Sheets-Sheet 1
FIG_1
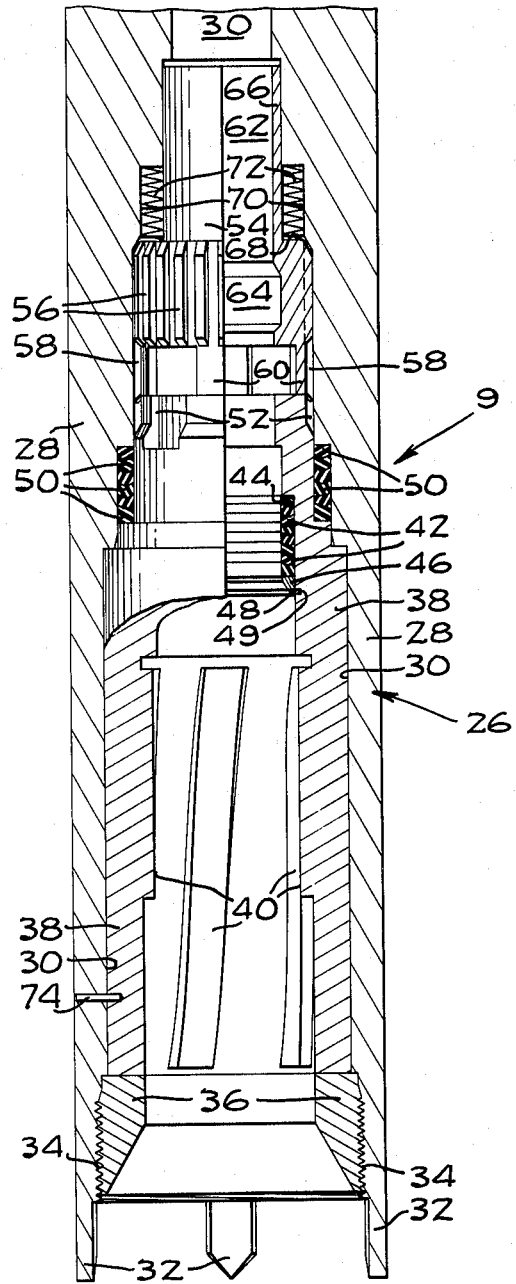
FIG_2
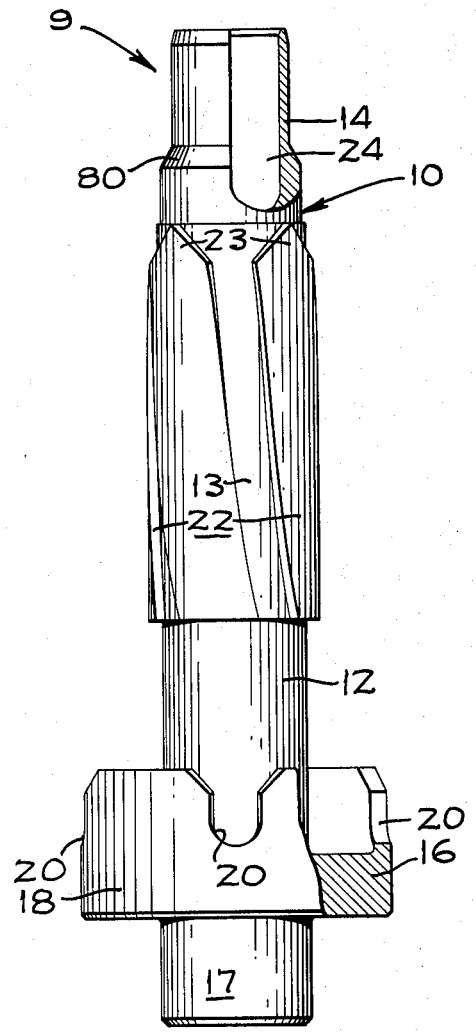
INVENTOR
WILLIAM L. TODD
BY Hans G. Hoffmeister
ATTORNEY

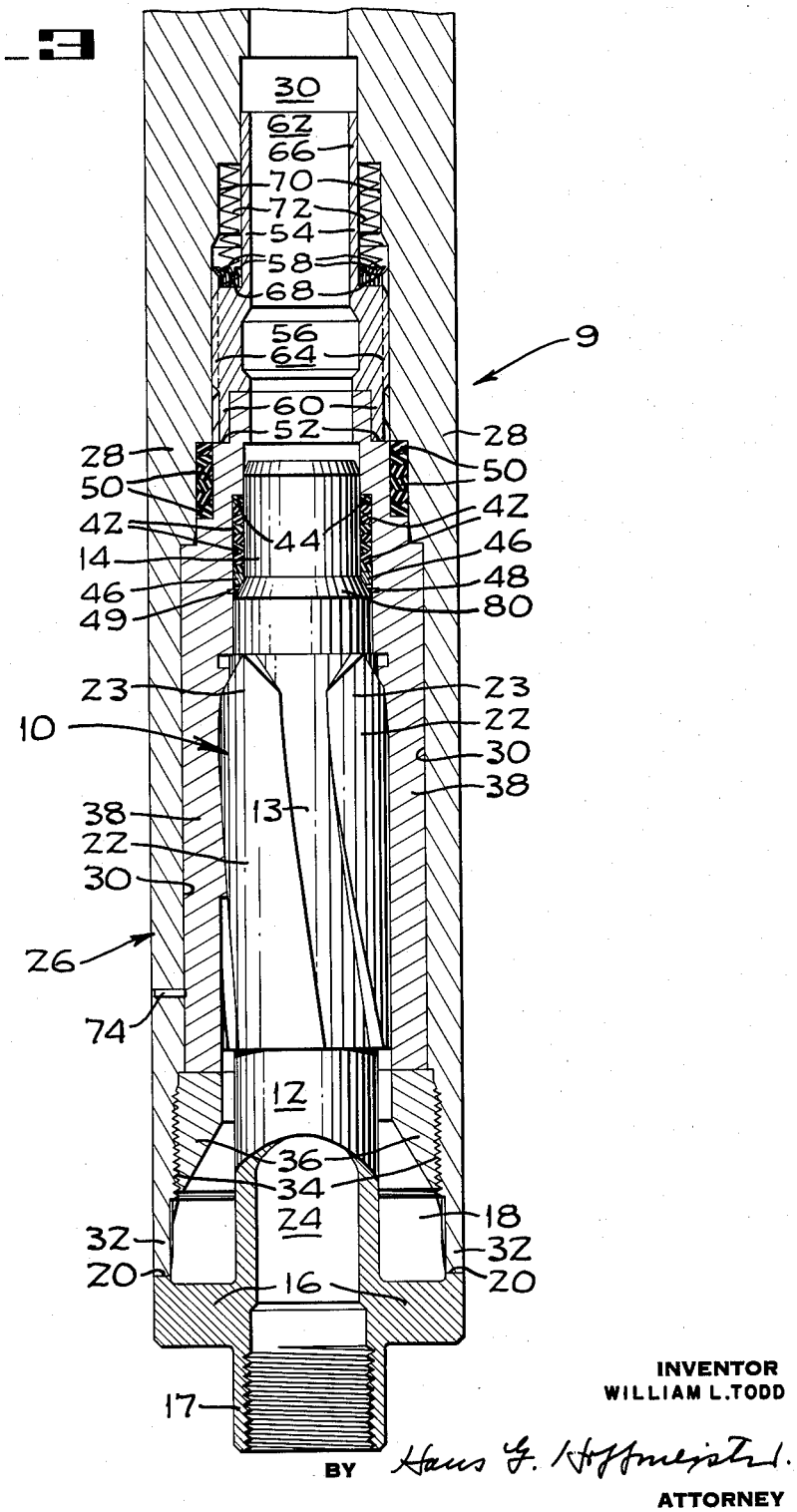

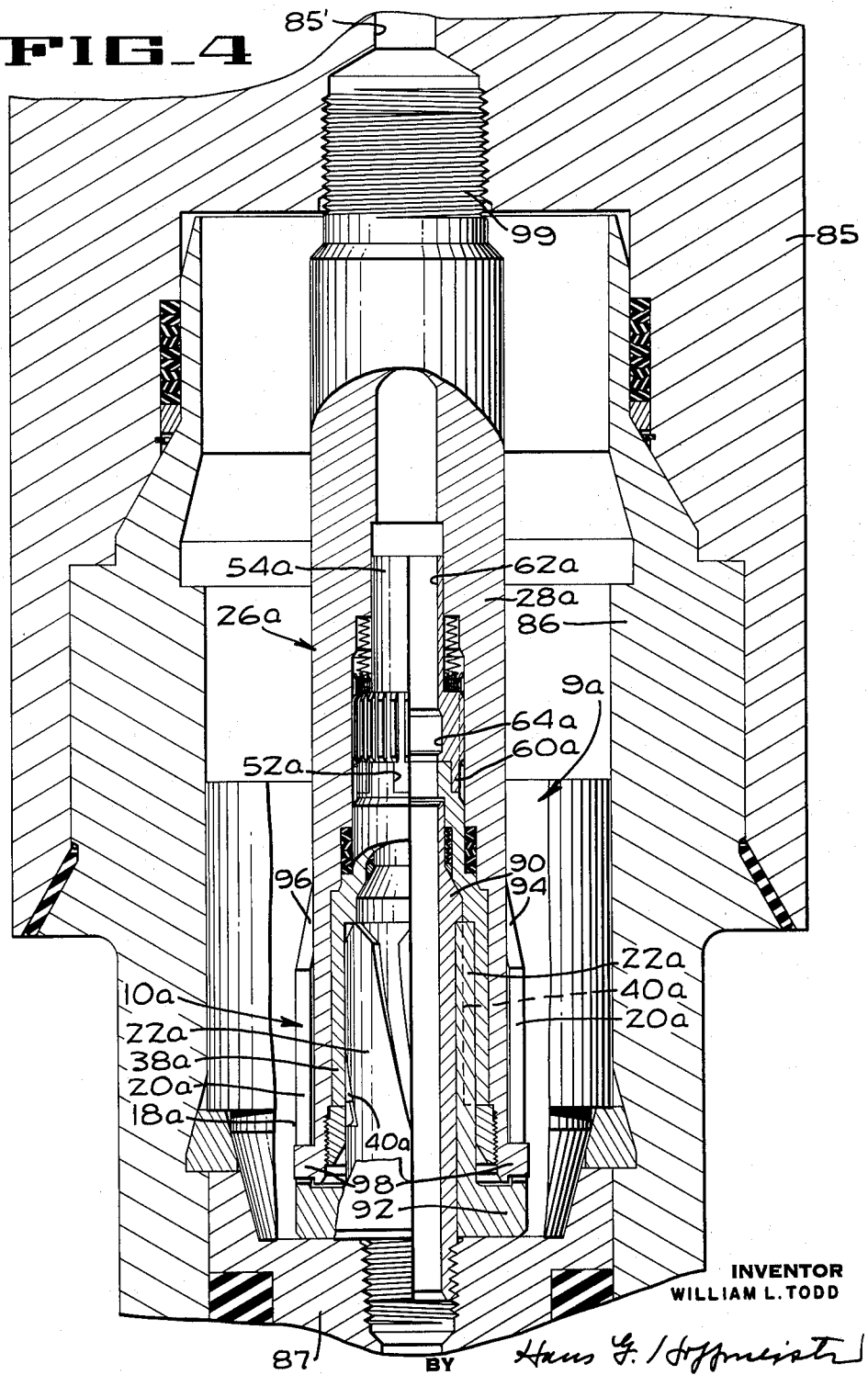

April 19, 1966 W. L. TODD 3,246,919
WELL COUPLING
Filed April 9, 1963 4 Sheets-Sheet 4
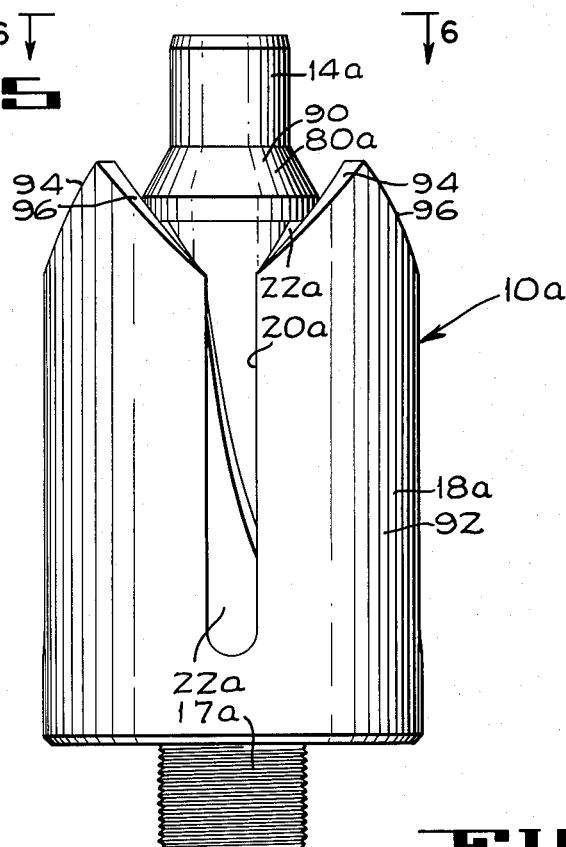
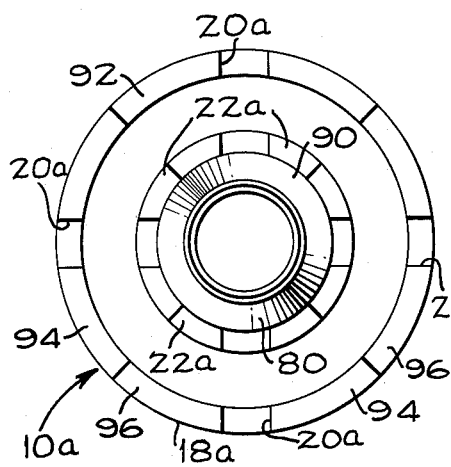
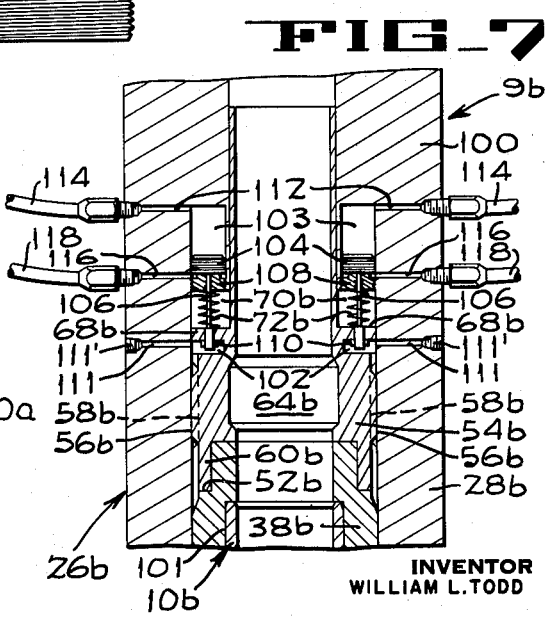
INVENTOR
WILLIAM L. TODD
BY Hans G. Hoffmeister
ATTORNEY

United States Patent Office 3,246,919
Patented Apr. 19, 1966

3,246,919
WELL COUPLING
William L. Todd, Houston, Tex., assignor to FMC Corporation, San Jose, Calif., a corporation of Delaware
Filed Apr. 9, 1963, Ser. No. 271,750
5 Claims. (Cl. 285—84)

The present invention pertains to a well coupling and more particularly to a coupling that is internally operable for automatically interconnecting and disconnecting adjacent units or sections of a well installation.

An object of the present invention is to provide a coupling that is internally operable for automatically interconnecting and disconnecting adjacent units or sections of a well installation.

Another object of the present invention is to provide a coupling that is operable from a remote position and which will automatically become latched when installed.

Another object is to provide a well coupling that can be unlatched from a remote position.

Another object is to provide a well coupling for packing off and releasably latching together two tubular sections without an external latching device.

These and other objects and advantages of the present invention will become apparent from the following description and the accompanying drawings, wherein:

FIG. 1 is a longitudinal section illustrating an assembled female member of the coupling of the present invention with certain parts being partially shown in elevation.

FIG. 2 is an elevation, partly broken away, of the male member of the coupling.

FIG. 3 is a vertical section partly in elevation, of the coupling with the male and female coupling members latched together.

FIG. 4 is a vertical section, partially in elevation, of a tubing head, tubing hanger and wellhead and showing another embodiment of the subject coupling as it is used to interconnect the wellhead and tubing head.

FIG. 5 is an enlarged elevation of the male member of the coupling illustrated in FIG. 4.

FIG. 6 is a plan of the coupling member shown in FIG. 5, as viewed from a position indicated by the line 6—6 in FIG. 5.

FIG. 7 is a vertical section of another embodiment of the subject coupling.

A coupling 9 embodying the present invention is illustrated in FIGS. 1–3 of the drawings. This coupling includes a male member 10 (FIGS. 2 and 3) providing an elongate tubular body or mandrel 12 having an intermediate or hub section 13, an upper end or nipple portion 14 of reduced diameter, a ring portion 16 of greater diameter than the section 13, and a lower internally threaded portion 17. The ring portion is provided with an upstanding peripheral flange 18 (FIG. 2) that has four upwardly facing, substantially U-shaped notches or slots 20 evenly spaced along its edge. Adjacent to the upper end of the intermediate section 13, the mandrel 12 has attached on its outer surface a series of circumferentially spaced, helical splines 22, each of which is formed with a point 23 at its upper end. A bore 24 of uniform diameter extends completely through the mandrel 12.

The coupling 9 also includes a female coupling member 26 (FIGS. 1 and 3) providing a tubular outer shell 28 having a stepped bore 30 and provided at its bottom edge with four lugs 32 of a size to permit their entry into the U-shaped notches 20 of the male coupling member 10. A locking sleeve 38 is rotatably mounted within the bore 30 and is held against axial movement therein by a retaining ring 36 which is screwed into a thread 34 formed on the inner surface of the shell 28 adjacent to its lower end. Circumferentially spaced, helical splines 40 are formed on the inner wall of the locking sleeve 38 and are of size to permit their interengagement with the helical splines 22 of the male coupling member 10.

A series of sealing rings 42 are provided above the splines 40. The inside diameters of the sealing rings 42 closely correspond to the outside diameter of the upper end portion 14 of the male coupling member 10. A reduced diameter of the bore of the sleeve 38 at a point above the uppermost sealing ring 42 provides a shoulder 44 to retain the rings when they are compressed into their sealing position in a manner presently to be explained. A metal backing ring 46 beneath the lowermost sealing ring 42 is held in place by a snap ring 48 which is seated in a circumferential slot 49 formed in the inner wall of the sleeve 38. The upper end of the sleeve 38 is sealed with relation to the bore 30 of the shell 28 by a series of sealing rings 50 which are compressed to expand them radially inward and outward when the retaining ring 36 is tightened against the sleeve 38. At its upper end the sleeve 38 is provided with a series of circumferentially spaced endwardly opening vertical slots 52.

A latching sleeve 54 is axially slidably fitted in the bore 30 of the shell 28 above the locking sleeve 38. Rotation of the latching sleeve 54 within the shell is prevented by a series of axially extending splines 56 on the sleeve 54 which mesh with internal splines 58 in the upper portion of the bore 30. The lower end of the latching sleeve 54 has a series of depending lugs 60 received in the slots 52 of the sleeve 38 when the lugs and the slots are aligned during installation of the coupling 9. The bore 62 of the sleeve 54 has an enlarged portion 64 for receiving an expansible unlatching tool, not shown, to unlatch the coupling after its installation. The manner of operation of the unlatching tool will be explained presently.

The latching sleeve 54 is provided at its upper end with a reduced diameter neck portion 66 and an upwardly facing shoulder 68 adjacent the upper end of the splines 56. A plurality of compression springs 72 are disposed in a counterbore 70 of the tubular body 28 and bear against the shoulder 68 of the sleeve 54. During the initial assembly (FIG. 1) of the female coupling member 26, the sleeve 54 is urged upward to compress the springs 72 by engagement of the upper end of the sleeve 38 with the lower end of the sleeve 54; this engagement is effected by keeping the lugs 60 and the slots 52 out of alignment. Misalignment of the lugs and notches is maintained by a shear pin 74 inserted through aligned apertures provided in the wall of the shell 28 and in the wall of the locking sleeve 38.

In operation of the coupling 9, the open lower end of the female coupling member 26 (FIG. 3) passes down over the upper end of the male coupling member 10, which is held stationary, in surrounding relation therewith. Thus, the splines 40 of the moving female member 26 enter the spaces between the splines 22 of the stationary coupling member 12, being guided thereinto by the points 23 on the upper ends of the splines 22. As penetration of the moving splines 40 between the stationary splines 22 progresses, torsion is applied to the locking sleeve 38 due to the helical nature of the splines, and the shear pin 74 is thereby sheared. The locking sleeve 38 is then free to rotate with respect to the shell 28 and does so as downward movement of the female coupling member 26 continues.

The lugs 32 on the bottom end of the shell 28 of the female coupling member 26 are eventually brought into alignment with and are seated within the notches 20 of the male coupling member 10. When the female coupling member 26 is fully engaged with the male coupling member 10, the slots 52 on the upper end of the sleeve 38 are aligned with the lugs 60 of the sleeve 54 thereby allowing the springs 72 to slide the latching sleeve 54 downward until the lugs 60 are seated in the slots 52 thereby latching or holding the locking sleeve against rotation in the shell 28.

As interfitting of the coupling members 10 and 26 takes place, as above described, an upwardly facing ledge 80 on the male coupling member 10 contacts the backing ring 46, and during the last increments of relative movement between said member, this ledge forces the ring upward and compresses the sealing rings 42 into intimate sealing engagement with both the male and female coupling members.

It will be understood, therefore, that the two coupling members 10 and 26 are latched together because of the interfitting of the helical splines 22 and 40 and because the locking sleeve 38, having the splines 40 thereon, is held against rotation by the non-rotatable latching sleeve 54. Furthermore, the coupling members are packed off by sealing rings 42 and 50.

When it is desired to uncouple the male and female coupling members 10 and 26, a suitable expansible tool (not shown) is inserted into the bore 62 of the latching sleeve 54 until it is disposed within the enlarged portion 64 of the bore. The tool is expanded to grip the surface of the bore portion 64 and is then raised to slide the sleeve 54 upward against the resistance of the springs 72. This disengages the lugs 60 from the slots 52 of the locking sleeve 38 and frees the latter for rotation. If the female coupling member 26 is then raised, the locking sleeve rotates, allowing the helical splines 40 and 22 to disengage, thus uncoupling the female coupling member 26 from the male coupling member 10.

A coupling 9a, similar to the coupling 9, is excellently suited for connecting a wellhead 85 (FIG. 4) to a tubinghead (or casinghead) 86 through a tubing hanger 87 locked in the tubinghead. The coupling 9a is modified as compared with coupling 9 in order to enable latching of the coupling 9a even though the hanger may rotate as it is run and locked in the tubinghead. In the description to follow of the modification of the invention which is illustrated in FIGS. 4, 5, and 6, elements which are the same as, or perform the same or similar functions as, corresponding elements of the embodiment shown in FIGS. 1, 2 and 3 are given the same reference numerals with the letter "a" appended thereto. In this coupling 9a, the male coupling member 10a (FIG. 5) includes a tubular spindle 90 and a bowl 92 freely rotatable thereon. Both the splines 22a and the peripheral flange 18a, with the U-shaped notches 20a therein are part of the bowl 92. It will be noted that the upper end of the flange 18a is chamfered to provide cam surfaces 94 and 96 which form V-shaped notches individually leading to the U-shaped notches 20a.

The spindle 90 (FIG. 5) has a lower externally threaded portion 17a projecting below the bowl 92, an upwardly facing ledge 80a, and an upper nipple portion 14a.

The outer shell 28a (FIG. 4) of the female coupling member 26a is provided with outwardly projecting lower lugs 98 which are adapted to be received within the U-shaped notches 20a of the male coupling member 10a, being guided thereinto by the cam surfaces 94 and 96. The shell also has an upper threaded portion 99.

In the operation (FIG. 4) of the coupling 9a, the lower portion 17a of the male member 10a is threaded into the tubing hanger 87, and the hanger is run and locked in the tubinghead 86 with the male member attached to the hanger. It will be understood that the bowl 92 is now concentric with and freely rotatable about the axis of the tubinghead. The upper portion 99 of the female member 26a is concentrically threaded into the wellhead 85, and the wellhead is lowered toward and fitted over the tubinghead.

As the male and female coupling members 10a and 26a move together, the lugs 98 contact the surfaces 94 and 96 and rotate the bowl 92 until the lugs 98 enter the slots 20a. As the coupling members move closer together, the internal helical splines 40a on the locking sleeve 38a engage between the helical splines 22a in the bowl 92 and cause rotation of the sleeve 38a with respect to the shell 28a. When the coupling 9a is fully engaged, the lugs 60a on the latching sleeve 54a are aligned with and move down into the slots or recesses 52a in the upper end of the sleeve 38a thereby to prevent movement of the sleeve 38a with respect to the shell 28a and to lock the coupling members and thus the wellhead 85 and tubinghead 86 together.

As described in regard to coupling 9, the coupling 9a is readily uncoupled, and thus the wellhead 85 is separated from the tubinghead 86, by running an expander tool, not shown, through the bore 85' of the wellhead and the bore 62a of the latching sleeve 54a into the enlarged portion 64a and lifting up on the latching sleeve 54a, as is now believed understood.

A coupling embodying the present invention is also useful for releasably interconnecting other sections or units of a well installation, which sections are indicated by numbers 100 and 101 in FIG. 7 and can be portions of a blowout preventer and a casinghead. FIG. 7 also illustrates how the coupling can be latched or unlatched by fluid pressure instead of by the expander tool as described above. In FIG. 7, the elements which are the same or have the same function as corresponding elements described above are given the same reference numerals with the letter "b" appended thereto.

The latching sleeve 54b in the bore of the female coupling member 26b, which in this form is integral with the blowout preventer 100, is provided with external splines 56b which interengage with internal splines 58b on the shell 28b. As before, the latching sleeve has a plurality of lugs 60b adapted to be received within the slots 52b of the rotatable locking sleeve 38b in the shell 28b.

In the coupling 9b of FIG. 7, the latching sleeve 54b is provided with a peripheral annular groove 102 beneath the shoulder 68b against which the springs 72b bear. A series of circumferentially spaced axially disposed cylinders 103 are formed in the shell 28b at the base of the counterbore 70b. A piston 104 is mounted in each of the cylinders 103. A piston rod 106 is fastened to each of the pistons 104 and extends downward therefrom through a piston head 108 threaded into the end of each cylinder 103, and through a corresponding coiled spring 72b. The lower end of each piston rod projects through the shoulder 68b of the sleeve 54b and into the annular groove 102. Cross pins 110 extend through the piston rods and lie against the lower surface of the shoulder for securing the rods to the sleeve 54b, and the shell 28b has pin access bores 111 leading to the groove 102 and closed by plugs 111'.

Passageways 112 connect first fluid conduits 114 to the cylinders 103 above their respective pistons 104, and similar passageways 116 connect the cylinders 103 beneath the pistons 104 to conduits 118. By application of fluid pressure through the conduits 118 or 114, the sleeve 54b is raised or lowered, respectively, to its unlatched or latched position. During the coupling operation, the sleeve 54b may be urged toward latching position by fluid pressure or by pressure of springs 72b as in the other embodiments. The fluid actuated latching sleeve 54b can be incorporated in either of the couplings 9 or 9a, as will be evident. On the other hand, the fluid actuated sleeve can still be unlatched by an expander tool, not shown, in the enlarged bore portion 64b, if necessary.

In the embodiment of FIG. 7, the male and female members 10b and 26b are integral with, that is, machined into, the casinghead 101 and the blowout preventer 100, respectively. In the coupling operation, the male and female members are indexed by a guide cable system, not shown, but well known in the art.

Although certain embodiments of the present invention have been described herein, it should be noted that various changes may be made therein without departing from the spirit of the invention as defined in the appended claims.

The invention having thus been described, what is believed to be new and desired to be protected by Letters Patent is:

1. In a well coupling, a tubular first member, a locking sleeve rotatably fitted within said first member, shearable means resisting rotation of said sleeve, means limiting axial movement of said sleeve within said first member, said sleeve having an endwardly opening slot therein, a latching sleeve having an endwardly projecting lug, said latching sleeve being axially slidably received in said first member for movement between a latching position with said lug fitted within said slot and an unlatched position with said lug withdrawn from said slot, means yieldably urging said latching sleeve toward its latching position, said shearable means holding said locking sleeve in a position wherein said lug and slot are circumferentially displaced from each other so that said yieldable means urges said lug into endwardly bearing engagement against said locking sleeve, a second coupling member insertable into said locking sleeve, and means on said locking sleeve and said second member for imposing torque on said locking sleeve when said second member is thrust into said locking sleeve thereby to break said shearable means and to move said slot into alignment with said lug and for precluding removal of said second member from said locking sleeve when said lug is fitted into said slot.

2. A coupling comprising a first tubular member provided with an axially extending bore, a first cylindrically walled sleeve fitted in said bore, said sleeve being rotatable about the axis of said bore; a ring means engaged with said first member and maintaining said sleeve in said bore in a fixed axial position, said sleeve being provided with a plurality of spaced apart helically shaped splines on the internal surface thereof, said sleeve being further provided with an axially extending slot at one end thereof, said member being further provided with a plurality of axially extending slots opening radially inward of said bore; a second cylindrical walled sleeve provided with a plurality of axially extending splines on the outer surface thereof, said second sleeve being disposed in said bore with said axially extending splines fitted within said axially extending slots, said second sleeve being further provided with an axially extending lug on one end thereof, said lug extending toward said one end of said first sleeve; spring means disposed between said member and the end opposite said one end of said second sleeve for biasing said second sleeve into contact with said first sleeve; a second tubular member provided with an axially extending bore, said second member being further provided with a plurality circumferentially spaced helically shaped grooves on its exterior surface, said second member being axially inserted into said first sleeve, said helically shaped grooves being arranged to receive said helically shaped splines and to cause rotation of said first sleeve as said second member is axially inserted into said first sleeve, said axially extending slot and said axially extending lug being further arranged to be aligned when said second member is fully inserted into said first sleeve, said spring urging said second sleeve axially so that said lug enters said slot when aligned therewith, said lug being arranged to prevent rotation of said first sleeve when inserted into said slot.

3. The coupling according to claim 2 wherein said first member is further provided with an axially extending lug, and wherein said second member is further provided with an annular flange, said flange being provided with an axially extending slot opening toward said first member, said lug on said flange being inserted into said slot on said first member when said member is inserted into said first sleeve for preventing relative rotation between said first and second members.

4. The coupling according to claim 2 wherein said first tubular member is provided with a radially extending opening, and said first sleeve is provided with a radially extending opening coextensive with the opening in said first member when said sleeve is angularly disposed in a first position in said first member; a shearable member disposed in said coextensive openings for releasable retaining said first sleeve in said first position.

5. In a well coupling, a first coupling member, a sleeve interfitted with said first member for rotation relative thereto but being limited in its axial movement with respect to first said member, a tubular second coupling member in telescoping relation with said sleeve, interengaging means on said sleeve and said second coupling member adjacent one end thereof for imparting rotation to the sleeve upon application of axial force urging said first and second coupling members toward and away from each other and interengaging means adjacent to the other end of said first and second coupling means for precluding rotary movement of said second coupling member and said sleeve out of said telescoping relation when the sleeve is held against rotation, and means for preventing rotation of the sleeve after said sleeve and second member are in predetermined telescoping relation.

References Cited by the Examiner

UNITED STATES PATENTS

| 2,557,349 | 6/1951 | Howard | 175—294 |
| 2,728,895 | 12/1955 | Quackenbush | 285—81 |
| 2,924,433 | 2/1960 | Osmun. | |
| 2,937,854 | 5/1960 | Kinley | 285—3 |
| 2,940,730 | 6/1960 | McClintock | 285—18 |
| 2,950,929 | 8/1960 | Nicolsen | 285—376 |
| 3,148,894 | 9/1964 | Schwab. | |

CARL W. TOMLIN, *Primary Examiner.*